US005991996A

United States Patent [19]
Leverette

[11] Patent Number: 5,991,996
[45] Date of Patent: Nov. 30, 1999

[54] SPINDLE ASSEMBLING AND DISASSEMBLING TOOL AND METHOD

[76] Inventor: Felton Clark Leverette, 2620 Mitch's Rd., Ambrose, Ga. 31512

[21] Appl. No.: 08/884,147

[22] Filed: Jun. 27, 1997

[51] Int. Cl.[6] ...... B23P 19/00

[52] U.S. Cl. ...... 29/426.5; 29/275; 269/16; 269/289 R; 269/900

[58] Field of Search ...... 29/402.03, 426.4, 29/426.5, 525, 254, 277, 275, 255; 269/16, 37, 43, 289 R, 900, 238

[56] References Cited

U.S. PATENT DOCUMENTS

| | | |
|---|---|---|
| 2,998,644 | 9/1961 | Thill . |
| 3,000,097 | 9/1961 | Hartz . |
| 3,083,449 | 4/1963 | Simmons . |
| 5,174,006 | 12/1992 | Ellis . |
| 5,210,918 | 5/1993 | Wozniak et al. . |
| 5,216,793 | 6/1993 | Semotiuk . |
| 5,301,409 | 4/1994 | Laframboise . |

*Primary Examiner*—P. W. Echols
*Assistant Examiner*—John Hong
*Attorney, Agent, or Firm*—Jones & Askew, LLP

[57] ABSTRACT

For disassembly purposes, a holder holds the bearing assembly of a spindle assembly so that a free end of the spindle of the spindle assembly extends upward from the bearing assembly. A guide aligns a disassembly striker with the free end of the spindle and the disassembly striker drives the spindle at least partially through the bearing assembly. The holder defines a lower collection chamber that the spindle falls into. For assembly purposes, the holder holds the bearing assembly and the spindle so that the spindle extends through the bearing assembly and the free end of the spindle extends upward from the bearing assembly. The guide aligns an assembly striker with the spindle and a collar that encircles the spindle. An internal surface of the assembly striker includes a annular first portion that abuts the collar. The assembly striker drives the collar onto the spindle until a stop arrests movement of the assembly striker and the collar. The stop is a second portion of the internal surface of the assembly striker that abuts a portion of the bearing assembly to arrest movement of the assembly striker and the collar relative to the spindle and the bearing assembly.

21 Claims, 3 Drawing Sheets

SPINDLE ASSEMBLING AND DISASSEMBLING TOOL AND METHOD

TECHNICAL FIELD

The present invention relates to tools, and more particularly relates to tools for assembling and disassembling spindles.

BACKGROUND OF THE INVENTION

Spindles are common mechanical components that rotate or support rotating components. For example, FIG. 1 is an exploded pictorial view of a conventional spindle assembly 20 that is part of a cotton picking machine. The spindle assembly 20 includes a spindle 22 having a gear 24 at one end. The gear 24 defines a shoulder 26 that encircles and extends perpendicularly from a journal 28 of the spindle 22. The spindle 22 further includes a tapered end 30 that fits through a bearing assembly 32 so that the journal 28 is journaled within the bearing assembly. The bearing assembly 32 includes a nut portion 34, an upper portion 36 extending upward from the nut portion, and a lower portion 40 extending downward from the nut portion. The upper portion 36 includes a beveled surface 38 and the lower portion 40 has a threaded exterior surface. An axial passage 42 is defined through the bearing assembly 32 and is open at the upper and lower ends of the bearing assembly. An annular bushing 44 is within the passage 42 and protrudes slightly from the lower end of the passage 42. Another annular bushing is within the passage 42 proximate to the upper end of the bearing assembly 32. The opening to the passage 42 at the upper end of the bearing assembly 32 is enlarged and can be characterized as a countersink 46. The countersink 46 is concealed from view in FIG. 1; therefore, it is depicted by broken-lines. A collar 48, which holds the spindle 22 to the bearing assembly 32, includes an upper beveled surface 50 and a lower cylindrical portion 52 that fits into the countersink 46 when the spindle assembly 20 is assembled. The spindle assembly 20 is shown fully assembled in FIGS. 2 and 8.

When the spindle assembly 20 is assembled, it can be attached to a machine, such as a cotton picking machine, by threading the lower portion 40 of the bearing assembly 32 into a threaded port. The gear 24 meshes with a drive gear, and a spool can be fit over the tapered end 30 of the spindle 22. Rotation of the spindle 22 rotates the spool to wind cotton onto the spool. Like many moving mechanical parts, spindle assemblies 20 become worn or broken with use and must be disassembled and reassembled for maintenance purposes.

Some conventional tools and methods for assembling and disassembling spindle assemblies 20 leave much to be desired. A conventional arrangement for disassembling a spindle assembly 20 is depicted in FIG. 2. The spindle assembly 20 depicted in FIG. 2 is fully assembled and lower surfaces of the nut portion 34 of the bearing assembly 32 are resting upon upper surfaces of a pair of blocks 54. Further, a ram 56 of a conventional hydraulic or screw-type press is positioned above the tapered end 30 of the spindle 22. Those skilled in the art will appreciate that forcing the ram 56 downward against the tip of the tapered end 30 forces the spindle 22 to move downward relative to the bearing assembly 32 and the collar 48. When the collar 48 encircles the tapered end 30 of the spindle 22, the spindle is no longer held to the bearing assembly 32 by the collar.

While the above-described conventional method of disassembling a spindle assembly 20 can be effective, it has some drawbacks. For example, presses of the type that include overhead rams 56 are relatively expensive and bulky items. Also, if the spindle assembly 20 is not axially aligned with the ram 56, it is possible for the spindle assembly 20 to pivot about a horizontal axis while the ram is forced downward against the tapered end 30 of the spindle 22. This can hamper disassembly efforts or damage the spindle assembly 20, and may cause the spindle assembly, portions of the spindle assembly, or the blocks 54 to be unexpectedly propelled in a manner that can cause injury to the person operating the ram 56.

A conventional arrangement for assembling the conventional spindle assembly 20 is depicted in FIG. 3. To achieve the arrangement depicted in FIG. 3, the spindle assembly 20 is partially assembled by passing the tapered end 30 of the spindle 22 through the bearing assembly 32, and then placing the collar 48 over the tapered end 30 of the spindle 22. Then, the tapered end 30 of the spindle assembly 22 is inserted into a pipe 58 so that the configuration depicted in FIG. 3 is achieved. The pipe 58 is depicted in side cross-sectional form in FIG. 3. As depicted in FIG. 3, the cylindrical portion 52 (FIG. 1) of the collar 48 is within the countersink 46 (FIG. 1) of the bearing assembly 32, and the gear 24 is distant from the bushing 44. The pipe 58 is completely cylindrical and is selected so that a portion of the beveled surface 50 of the collar 48 abuts the upper end of the pipe 58, and no other portions of the spindle assembly 20 contact the pipe 58 during the assembly of the spindle assembly.

With the spindle assembly 20 and the pipe 58 arranged as depicted in FIG. 3, those skilled in the art will appreciate that forcing the ram 56 downward against the gear 24 forces the spindle 22 through the bearing assembly 32 and the collar 48 until the shoulder 26 abuts the exposed rim of the bushing 44. This has the effect of pressing the collar 48 onto the spindle 22 so that the spindle assembly 20 becomes assembled. The person operating the ram 56 must be careful to properly assembly the spindle assembly. The spindle assembly 20 is properly assembled when the collar 48 and the shoulder 26 abut the opposite ends of the bearing assembly 32 to prevent axial movement of the spindle 22 relative to the bearing assembly 32, and the spindle 22 can easily rotate about its elongate axis within and relative to the bearing assembly 32.

While the above-described conventional method for assembling a spindle assembly 20 can be effective, it also has some drawbacks. For example, it is common for the collar 48 to be pressed too far onto the spindle 22 so that there is too much friction between the opposite ends of the bearing assembly 32 and the collar 48 and the shoulder 26, respectively. When this friction is too great, rotation of the spindle 22 about its elongate axis relative to the bearing assembly is restricted. Also, if the ram 56 is lowered too far, the spindle assembly 20 can be damaged. Further, if the spindle assembly 20 or pipe 58 are not axially aligned with the ram 56, it is possible for the spindle assembly 20 or pipe 58 to pivot about a horizontal axis while the ram is forced downward. This can hamper assembly efforts or may damage the spindle assembly 20, and may cause the spindle assembly, portions of the spindle assembly, or the pipe 58 to be unexpectedly propelled in a manner that can cause injury to the person operating the ram 56.

A further drawback to both the above-discussed conventional methods is that rams 56 are typically located in machine shops, or the like, that are remote from the locations, such as farming fields, where the spindles assemblies 20 are used. It is very inconvenient to have to go to a machine shop every time maintenance needs to be performed on a spindle assembly 20.

Thus, there is a need in the art for an improved tool for assembling and disassembling spindle assemblies.

SUMMARY OF THE INVENTION

The present invention seeks to provide an improved tool for assembling and disassembling spindle assemblies, which is compact, easy and efficient to use, can easily be taken into and used in the field, reduces the potential for damaging spindle assemblies or causing injury to persons assembling and disassembling spindle assemblies, and consistently provides for the proper assembly and disassembly of spindle assemblies.

In accordance with the invention, this object is accomplished by providing a holder for mating with and holding one end of the spindle assembly and a guide for fitting over and mating with the opposite end of the spindle assembly. The guide axially aligns a striker with the spindle assembly so that a blow delivered upon an exposed end of striker causes the opposite end of the striker to impact upon the spindle assembly for assembly or disassembly purposes.

The holder and guide define cavities that contain portions of the spindle assembly while the holder and guide are mated to opposite portions of the spindle assembly. The mating and the cavities maintain the alignment of moving parts and allow axial movement of moving parts so that proper assembly and disassembly of spindle assemblies can be easily and consistently achieved. Also, the mating and the cavities cooperate to contain the parts of the tool and the parts of the spindle assembly so that parts are not unexpectedly propelled from the tool during assembly and disassembly.

More particularly, the holder includes a first upright extending upward from a base plate for holding the spindle assembly for disassembly. The holder also includes a second upright extending upward from the base plate for holding the spindle assembly for assembly. A single guide may be moved between the first upright and the second upright. A different striker is used for assembly and disassembly.

When the tool of the present invention is configured for disassembling a spindle assembly, the holder holds the bearing assembly of the spindle assembly so that the tapered end of the spindle extends upward from the bearing assembly. The guide defines an elongate guide cavity and a first opening to the guide cavity that fits over the tapered end of the spindle. The guide further defines a second opening to the guide cavity for receiving a disassembly striker with its upper end extending from the second opening. A blow delivered upon the upper end of the disassembly striker causes the disassembly striker to move within the guide cavity to drive the spindle at least partially through the bearing assembly. The holder defines a lower collection chamber that the spindle falls into after the spindle is driven through the bearing assembly.

When the tool of the present invention is configured for assembling a spindle assembly, the holder holds the bearing assembly and the spindle so that they are partially assembled to one another and the tapered end of the spindle extends upward from the bearing assembly. The collar and the first opening of the guide are fit over the tapered end of the spindle. An upper end of an assembly striker extends from the second opening of the guide so that a blow upon the upper end of the assembly striker causes the assembly striker to move downward within the guide cavity.

The assembly striker includes an internal surface defining a striker cavity for receiving the tapered end of the spindle. The internal surface of the assembly striker includes an annular first portion. When the tool is arranged for assembling a spindle assembly, the first portion of the internal surface of the assembly striker abuts the collar encircling the spindle. In response to a blow upon the upper end of the assembly striker, the first portion of the internal surface causes the collar to move downward with the assembly striker. The collar and the assembly striker continue to move within the guide cavity in response to blows upon the upper end of the assembly striker, until a stop arrests movement of the assembly striker and the collar.

The stop is an annular second portion of the internal surface of the assembly striker. The second portion of the internal surface is operative for abutting a portion of the bearing assembly to arrest movement of the assembly striker and the collar relative to the spindle assembly. The stop arrests movement of the collar and the assembly striker when the collar is installed at approximately a predetermined position on the spindle. With the collar in the predetermined position, the collar is proximate to the bearing assembly and cooperates with the bearing assembly to restrict axial movement of the spindle relative to the bearing assembly. Also, with the collar in the predetermined position, the spindle can rotate about its axis relative to the bearing assembly.

Other objects, features and advantages of the present invention will become apparent upon review of the following detailed description of the invention, when taken in conjunction with the appended drawings.

DETAILED DESCRIPTION OF THE PREFERRED EMBODIMENT

Figure 1:
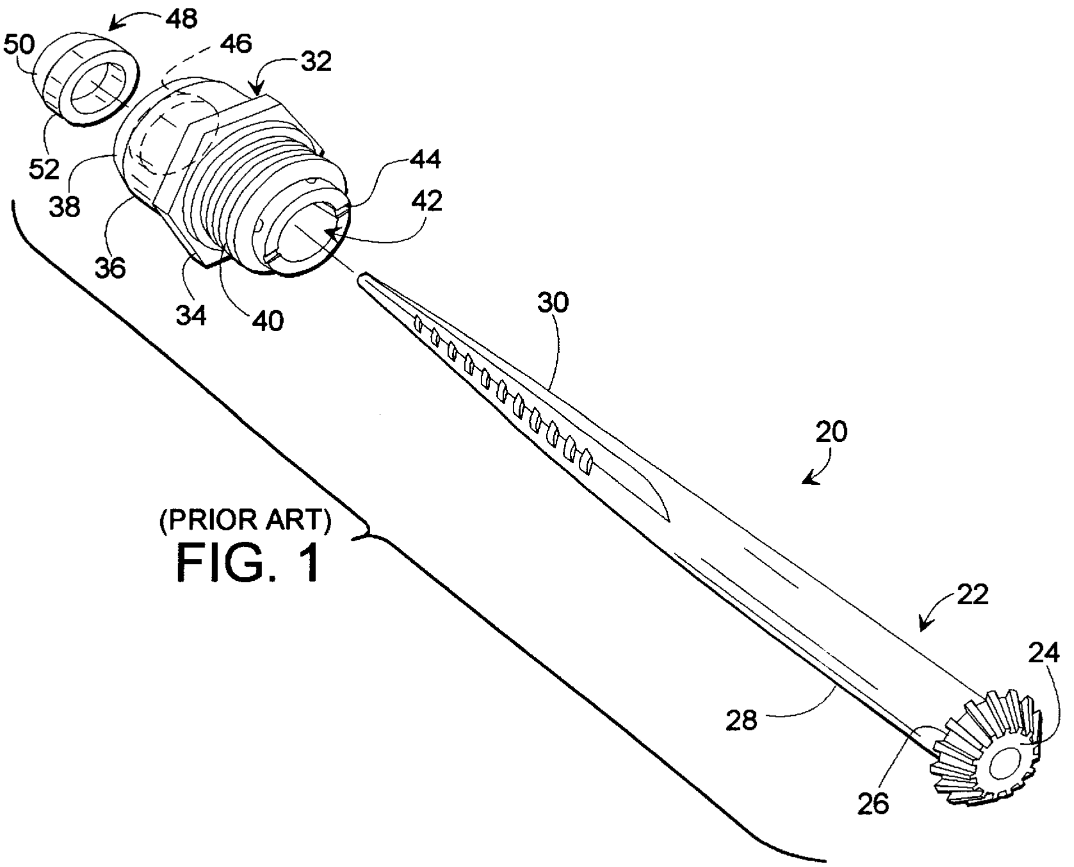
(PRIOR ART) FIG. 1
FIG. 1 is an exploded pictorial view of an exemplary conventional spindle assembly.
Figure 4:
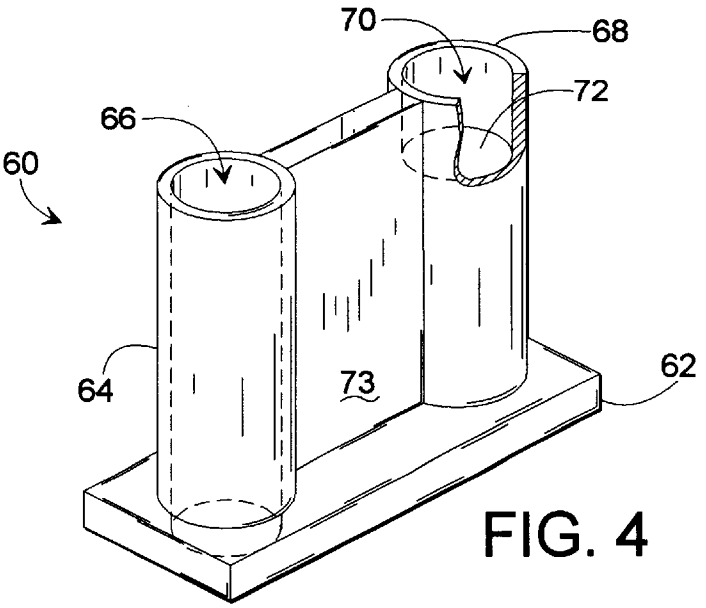
FIG. 4 is an isolated, pictorial, partially cut-away view of the holder that is a portion of the tool of the present invention.
Figure 8:
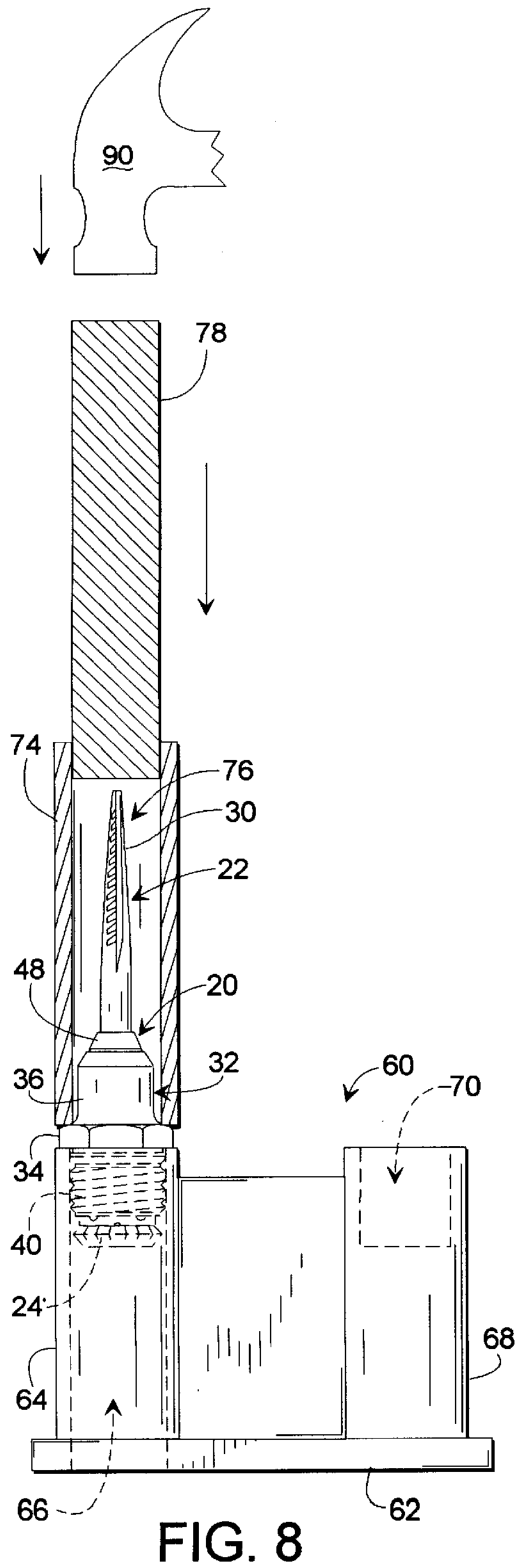
FIG. 8 shows the tool of the present invention, with portions cross-sectioned, arranged for disassembling the conventional spindle assembly.
Figure 9:
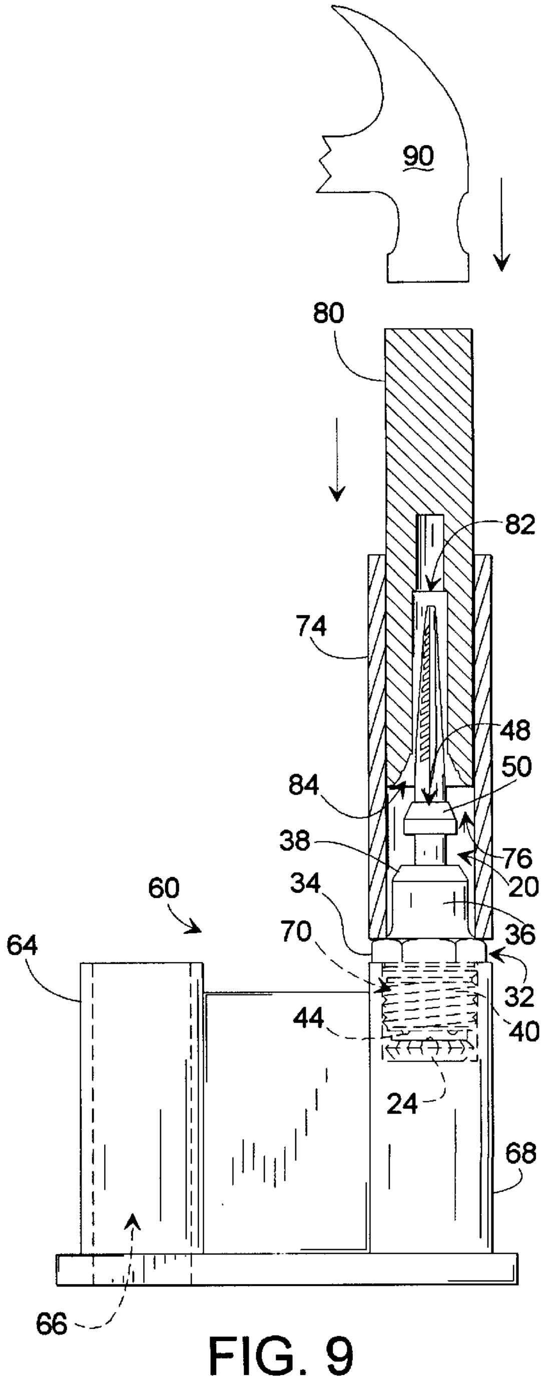
FIG. 9 shows the tool of the present invention, with portions cross-sectioned, arranged for assembling the conventional spindle assembly.

Referring now to the drawings, in which like numerals refer to like parts throughout the several views, FIGS. 4–7 are isolated pictorial views of the individual components of the tool of the present invention. FIG. 4 is a pictorial view of a holder 60 that includes two different stations for holding the spindle assembly 20 (FIG. 1). Referring to FIGS. 8 and 9, which show the tool of the present invention in use, while the spindle assembly 20 is held by either of the stations of the holder 60, a guide 74 (FIGS. 5, 8 and 9) is fit over the upper end of the spindle assembly. The guide 74 receives a disassembly striker 78 (FIGS. 6 and 8) or an assembly striker 80 (FIGS. 7 and 9) that are driven against a portion of the spindle assembly 20 to disassemble and assemble the spindle assembly, respectively.

Referring to FIG. 4, the holder 60 includes a horizontal base plate 62 from which a disassembly cylinder 64 extends upward to define a disassembly station. The disassembly cylinder 64 is cylindrical and defines a coaxial, cylindrical disassembly cavity 66. The disassembly cavity 66 is partially depicted by broken lines in FIGS. 4, 8 and 9. The disassembly cavity 66 is open at the top of the disassembly cylinder 64, extends through the base plate 62, and is open at the bottom of the base plate.

An assembly cylinder 68 extends upward from the base plate 62 to define an assembly station. The assembly cylinder 68 defines a coaxial, cylindrical assembly cavity 70. The assembly cavity 70 is partially depicted by broken lines in FIGS. 4, 8 and 9, and is open at the top of the assembly cylinder 68. The assembly cylinder 68 includes a horizontal floor 72 that defines the lower end of the assembly cavity 70. A vertical reinforcing plate 73 is connected between the disassembly cylinder 64, the assembly cylinder 68 and the base plate 62.

Figure 5:
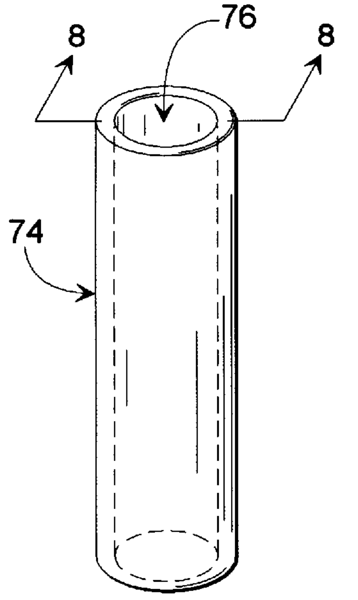
FIG. 5 is an isolated pictorial view of the guide that is a portion of the tool of the present invention.

FIG. 5 is a top, side, pictorial view of the cylindrical guide 74. The guide 74 defines a coaxial cylindrical guide cavity 76 that is open at the opposite ends of the guide. The guide cavity 76 is partially concealed from view in FIG. 5; therefore, it is partially depicted by broken-lines.

Figure 6:
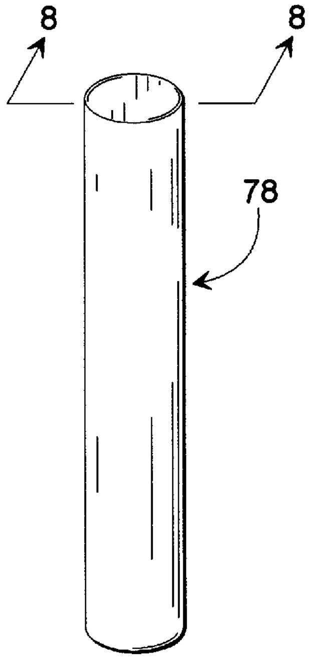
FIG. 6 is an isolated pictorial view of the disassembly striker that is a portion of the tool of the present invention.

FIG. 6 is a top, side, pictorial view of the generally cylindrical, solid disassembly striker 78. The external diameter of the lower portion of the disassembly striker 78 is just slightly less than the internal diameter of the guide 74. Therefore, the guide cavity 76 can receive the lower portion of the disassembly striker 78, and the lower portion of the disassembly striker can be reciprocated within the guide cavity. The upper end of the disassembly striker 78 is slightly enlarged so that it will not fit within the guide cavity 76.

Figure 7:
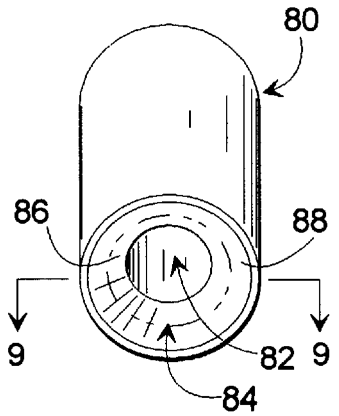
FIG. 7 is an isolated pictorial view of the assembly striker that is a portion of the tool of the present invention.

FIG. 7 is a bottom, side, pictorial view of the generally cylindrical assembly striker 80. A top, side, pictorial view of the assembly striker 80 is identical to the view of FIG. 6. The assembly striker 80 includes an internal surface defining an axially extending striker cavity 82. The striker cavity 82 is open at the bottom of the assembly striker 80 and closed toward the top of the assembly striker. The interior surface of the striker assembly 80 includes an annular collar engaging surface 86 and an annular bearing engaging surface 88 that are contiguous. The collar engaging surface 86 and the bearing engaging surface 88 are distinguished from one another in FIG. 7 by a phantom broken line. The collar engaging surface 86 and the bearing engaging surface 88 cooperate to define an enlarged or countersunk portion 84 of the striker cavity 82.

The external diameter of the lower portion of the assembly striker 80 is just slightly less than the internal diameter of the guide 74. Therefore, the guide cavity 76 can receive the lower portion of the assembly striker 80, and the lower portion of the assembly striker 80 can be reciprocated within the guide cavity 76. The upper end of the assembly striker 80 is slightly enlarged so that it will not fit within the guide cavity 76.

Disassembling a Spindle Assembly

FIG. 8 shows the tool of the present invention cooperating with the assembled conventional spindle assembly 20. The guide 74 and the disassembly striker 78 are shown in side cross-sectional form, and the tool of the present invention is configured for disassembling the spindle assembly 20. The guide 74 is cross-sectioned along line 8—8 in FIG. 5, and the disassembly striker 78 is cross-sectioned along line 8—8 in FIG. 6.

As depicted in FIG. 8, the lower portion 40 of the bearing assembly 32 is mated to the upper end of the disassembly cylinder 64. More particularly, the lower surface of the nut portion 34 of the bearing assembly 32 is resting upon the upper rim of the disassembly cylinder 64 so that the lower portion 40 of the bearing assembly and the gear 24 of the spindle 22 are suspended within the disassembly cavity 66. While the spindle assembly 20 is held by the holder 60 in the manner depicted in FIG. 8, the upper portion of the internal surface of the disassembly cylinder 64 closely bounds the lower portion 40 of the bearing assembly 32. That close bounding, the resting of the nut portion 34 upon the upper rim of the disassembly cylinder 64, and the breadth of the base plate 62 tend to keep the spindle assembly 20 from pivoting about a horizontal axis during disassembly. Further, that bounding does not interfere with the insertion of the lower portion 40 into, or the withdrawal of the lower portion 40 from, the disassembly cavity 66.

As depicted in FIG. 8, the guide 74 is fit over the spindle assembly 20 so that the lower rim of the guide is resting upon the upper surface of the nut portion 34 and the tapered end 30 of the spindle 22 is within the guide cavity 76. Further, the lower end of the guide 74 can be characterized as being mated to the upper portion 36 of the bearing assembly 32. More particularly, while the guide 74 is fit over the bearing assembly 32 as depicted in FIG. 8, a portion of the internal surface of the guide bounds the upper portion 36 of the bearing assembly. That bounding and the resting of the lower rim of the guide 74 upon the upper surface of the nut portion 34 tend to keep the spindle assembly 20 from pivoting about a horizontal axis during disassembly. That bounding does not interfere with the fitting of the guide 74 over, or the removal of the guide from, the upper portion 36 of the bearing assembly 32.

When the lower end of the disassembly striker 78 is inserted into the guide cavity 76 as depicted in FIG. 8, the disassembly striker 78 will descend under the force of gravity until the lower end of the disassembly striker 78 contacts the tip of the spindle 22. Then, an object such as a hammer 90 is used to strike a blow or blows upon the upper end of the disassembly striker 78. Blows upon the upper end of the disassembly striker 78 drive the disassembly striker downward, which forces the spindle 22 to travel downward relative to the base 60, the bearing assembly 32, and the collar 48.

Once the spindle 22 has been pushed through the collar 48 so that the collar is disengaged and proximate to the tapered end 30 of the spindle 22, the lower end of the spindle falls under the force of gravity into the disassembly cavity 66. When the spindle 22 falls into the disassembly cavity 66, the gear 24 rests upon the surface that the base plate 62 is resting upon and a majority of the spindle is within the disassembly cavity. Then, the guide 74 and disassembly striker 78 are lifted away from the bearing assembly 32. Then, the bearing assembly 32 and the collar 48 are lifted from the holder 60. Then, the holder 60 is lifted so that the spindle 22 passes out of the bottom opening to the disassembly cavity 66.

The tool of the present invention is constructed so that the disassembly striker 78, the guide cavity 76, the spindle assembly 20, and the disassembly cavity 66 remain axially aligned during the disassembly process. Therefore, the tool of the present invention and the spindle assembly 20 do not tend to pivot about a horizontal axis or become bound while blows are struck upon the upper end of the disassembly striker 78. Further, the guide cavity 76 and the disassembly cavity 66 substantially contain the moving parts of the tool and the spindle assembly 20 so that, although considerable amounts of force may be present, parts are safely contained.

Assembling a Spindle Assembly

FIG. 9 shows the tool of the present invention cooperating with the partially assembled spindle assembly 20. The guide 74 and the assembly striker 80 are shown in side cross-sectional form, and the tool of the present invention is configured for assembling the spindle assembly 20. The guide 74 is cross-sectioned along line 8—8 in FIG. 5, and the disassembly striker 78 is cross-sectioned along line 9—9 in FIG. 7.

As depicted in FIG. 9, the lower portion 40 of the bearing assembly 32 is mated to the upper end of the assembly cylinder 68. More particularly, the lower surface of the nut portion 34 is resting upon the upper rim of the assembly cylinder 68 so that the lower portion 40 of the bearing assembly 32 and the gear 24 of the spindle 22 are mated to the assembly cylinder 68. That is, while the spindle assembly 20 is held by the holder 60 as depicted in FIG. 9, the lower portion 40 of the bearing assembly 32 and the gear 24 are within the assembly cavity 70. The annular portion of the internal surface of the assembly cylinder 68 closely bounds the lower portion 40 of the bearing assembly 32. That close bounding, the resting of the nut portion 34 upon the upper rim of the assembly cylinder 68, and the breadth of the base plate 62 tend to keep the spindle assembly 20 from pivoting about a horizontal axis during assembly. That close bounding does not interfere with the insertion of the lower portion 40 into, or the withdrawal of the lower portion 40 from, the assembly cavity 70.

As depicted in FIG. 9, the bottom of the gear 24 is resting upon the floor 72 (FIG. 4) that defines the bottom of the assembly cavity 70. The distance defined between the floor 72 and the upper rim of the assembly cylinder 68 allows the bottom surface of the nut portion 34 to rest upon the upper rim of the assembly cylinder 68 while the bottom surface of the gear 24 rests upon the floor 72 and the shoulder 26 (FIG. 1) abuts the lower, exposed rim of the bushing 44. As a result, the journal 28 (FIG. 1) of the spindle 22 is perfectly positioned within the bearing assembly 32 while the spindle assembly 20 is held by the assembly cylinder 68 in the manner depicted in FIG. 9. That is, while the spindle assembly 20 is being held by the assembly cylinder 68 as depicted in FIG. 9, the spindle 22 and the bearing assembly 32 are preferably in the same relative positions that they will be in once the spindle assembly is fully and perfectly assembled.

With the spindle 22 and the bearing assembly 32 held by the assembly cylinder 68 as discussed above, the collar 48 is fit over the upper end of the spindle 22 and released so that it assumes approximately the position depicted in FIG. 9. The guide 74 is then fit over the spindle assembly 20 so that the lower rim of the guide rests upon the upper surface of the nut portion 34 of the bearing assembly 32 and the tapered end 30 of the spindle 22 is within the guide cavity 76. While the guide 74 is fit over the bearing assembly 32 as depicted in FIG. 9, the lower end of the guide is mated to the upper portion 36 of the bearing assembly 32. More particularly, a portion of the internal surface of the guide 74 bounds the upper portion 36 of the bearing assembly 32. That bounding and the resting of the lower rim of the guide 74 upon the upper surface of the nut portion 34 tend to keep the spindle assembly 20 from pivoting about a horizontal axis during assembly. That bounding does not interfere with the fitting of the guide 74 over, or the removal of the guide from, the upper portion 36 of the bearing assembly 32.

Once the guide 74 is fit over the partially assembled spindle assembly 20 as discussed above, the assembly striker 80 is inserted into the upper opening to the guide cavity 76 and released so that the assembly striker moves downward in the guide cavity until the collar engaging surface 86 (FIG. 7) abuts the bevel surface 50 of the collar 48. The internal diameter of the collar 48 is approximately the same as, or just slightly greater than, the outer diameter of the midsection of the spindle 22. The weight of the assembly striker 80 is great enough to cause the assembly striker to move within the guide cavity 76 into contact with the collar 48, but not great enough to cause the collar to move downward along the spindle 22 into its fully installed position.

While the tool of the present invention is arranged as shown in FIG. 9, but with the assembly striker 80 positioned lower in the guide cavity 76 so that at least a portion of the collar engaging surface 86 (FIG. 7) abuts the bevel surface 50 of the collar 48, an object such as a hammer 90 is used to strike a blow or blows upon the upper end of the assembly striker 80. Such blows drive the assembly striker 80 downward. When the assembly striker 80 is driven downward, the collar 48 travels downward with the assembly striker due to the abutting between the collar engaging surface 86 and the bevel surface 50. The assembly striker 80 and collar 48 move relative to the spindle 20 and the bearing assembly 32. In response to blows from the hammer 90, the assembly striker 80 and the collar 48 continue to travel downward together, until the downward traveling is arrested.

Figure 2:
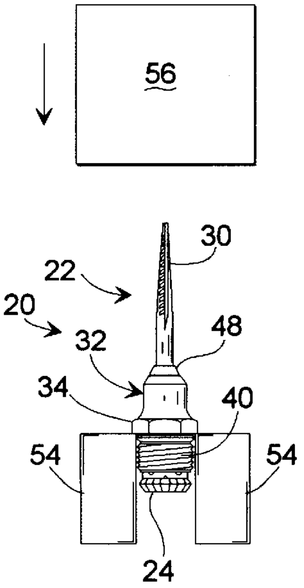
(PRIOR ART) FIG. 2
FIG. 2 shows the conventional spindle assembly fully assembled and cooperating with conventional components that are conventionally arranged for disassembling the spindle assembly.

Downward movement of the assembly striker 80 and the collar 48 relative to the spindle 20 and the bearing assembly 32 is arrested when the collar reaches a predetermined position. When the collar 48 is in the predetermined position, it is proximate to the bearing assembly 32 such that axial movement of the spindle 22 relative to the bearing assembly is precluded and rotation of the spindle about its axis relative to the bearing assembly is readily allowed. That is, downward movement of the assembly striker 80 and the collar 48 relative to the spindle 20 and the bearing assembly 32 is arrested when the spindle assembly 20 is configured as depicted in FIGS. 2 and 8. The arresting occurs when the assembly striker 80 and the collar 48 have moved sufficiently downward relative to the bearing assembly 32 and the spindle 22 so that a portion of the bearing engaging surface 88 (FIG. 7) abuts a portion of the bevel surface 38 of the bearing assembly. The bearing engaging surface 88 and the collar engaging surface 86 of the assembly striker 80 are arranged to contemporaneously abut the bevel surface 38 of the bearing assembly 32 and the bevel surface 50 of the collar 48, respectively, when the spindle assembly 20 is perfectly assembled. The positive arresting of the movement of the assembly striker 80 and the collar 48 provides an objective indication that the spindle assembly 20 is perfectly assembled.

The tool of the present invention functions so that the assembly striker 80, the guide cavity 76, the spindle assembly 20, and the assembly cavity 70 remain axially aligned during the assembly process. Therefore, the tool of the present invention and the spindle assembly 20 do not tend to pivot about a horizontal axis or become bound while blows are struck upon the upper end of the assembly striker 80.

Further, the guide cavity 76 substantially contains the moving parts of the tool and the spindle assembly 20 so that, although considerable amounts of force may be present, parts are safely contained.

Figure 3:
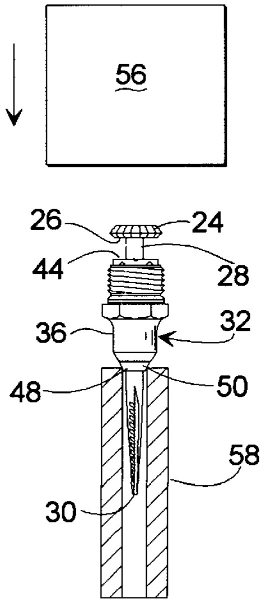
(PRIOR ART) FIG. 3
FIG. 3 shows the conventional spindle assembly partially assembled and cooperating with conventional components that are conventionally arranged for assembling the spindle assembly.

Once the spindle assembly 20 has been assembled, the guide 74 and the assembly striker 80 are lifted away from the bearing assembly 32, and then the assembled spindle assembly 20 is lifted from the holder 60. Because of tolerances allowed during the manufacture of spindle assemblies 20 or wear of spindle assemblies 20, it is potentially possible for a spindle assembly 20 to be assembled too tightly when using the tool and methods of the present invention. That is, it is possible for the collar 48 to be pushed too tightly against the bearing assembly 32. When the collar 48 is in that position, rotation of the spindle 22 about its axis relative the gear assembly 32 is restricted due to the frictional interaction between the collar and the gear assembly, and due to the frictional interaction between the shoulder 26 (FIGS. 1 and 3) and the gear assembly. If this occurs, the over-tightened spindle 20 and the tool of the present invention are arranged as depicted in FIG. 8, and the hammer 90 is tapped lightly against the upper end of the disassembly striker 78 so that the spindle 22 moves axially, just slightly, relative to the collar 48. This will decrease the frictional interaction between the collar 48 and the bearing assembly 32, and between the shoulder 26 and the bearing assembly, so that the spindle 22 can rotate freely about its axis within the bearing assembly.

In accordance with a first alternative embodiment of the present invention, the upper end of the assembly striker 80, which is the solid end, is not enlarged, and the disassembly striker 78 is not employed. In that first alternative embodiment, the solid end of the assembly striker 80 is inserted into the guide 74 and blows are struck upon the non-solid end of the assembly striker for disassembly purposes, as should be understood by those skilled in the art in light of this disclosure. In accordance with a second alternative embodiment of the present invention, the guide 74, the disassembly striker 78, and assembly striker 80 are not cylindrical, yet they still provide the mating and aligned relationships discussed above. For example, those components could define square cross-sections.

While this invention has been described in detail with particular reference to a preferred embodiment thereof, it will be understood that modifications and variations may be made without departing from the scope of the invention as defined in the appended claims.

What is claimed is:

1. A method of fitting a collar onto a spindle extending from a bearing assembly, comprising the steps of:

holding the bearing assembly and the spindle with a holder so that an end of the spindle extends from the bearing assembly and the collar is fit over the end of the spindle;

fitting a striker over the end of the spindle and then moving the striker along the spindle in a first direction so that a first portion of the striker abuts and forces the collar to move with the striker along and relative to the elongate axis of the spindle in the first direction, and a second portion of the striker abuts a surface of the bearing assembly and thereby arrests movement of the striker and the collar relative to the spindle in the first direction to define the position of the collar on the spindle.

2. The method of claim 1, wherein:

the method further comprises the steps of:

placing a guide that defines an elongate guide cavity over the end of the spindle so that the end of the spindle is within the guide cavity; and positioning the striker within the guide cavity with the spindle so that the striker is fit over the end of the spindle and an end of the striker protrudes from the guide cavity; and the moving step comprising the step of hitting the end of the striker that protrudes from the guide cavity.

3. The method of claim 1, further comprising the steps of:

holding the bearing assembly with the second holder so that an end of the spindle extends from the bearing assembly;

placing a guide that defines an elongate guide cavity over the end of the spindle so that the end of the spindle is within the guide cavity;

positioning the second striker within the guide cavity with the spindle; and forcing the second striker against the spindle within the guide cavity to force the spindle to move axially relative to the bearing assembly.

4. The method of claim 3, wherein the second holder defines an elongate collection cavity and the spindle falls at least partially into and is at least partially contained by the collection cavity in response the spindle moving axially relative to the bearing assembly; and the forcing step includes a step of delivering a blow upon an end of the second striker that is opposite from the spindle and protrudes from the guide cavity.

5. A tool for installing a collar onto a spindle assembly comprising a bearing assembly and a spindle comprising a first end, a second end and a journal extending through the bearing assembly, the tool comprising:

a striker operative for concurrently fitting over the first end of the spindle and moving relative to the spindle in a first direction defined as being from the first end of the spindle toward the second end of the spindle, said striker comprising:

an internal surface defining a void for receiving the first end of the spindle, said internal surface varying in cross-section to define:

a first portion configured to engage the collar and force the collar to move with said striker relative to the spindle in the first direction, while the collar encircles the first end of the spindle and the striker is fit over the first end of the spindle; and, a second portion configured to engage an upwardly facing surface of the bearing assembly and arrest movement of said striker and the collar relative to the spindle in the first direction to define the position of the collar on the spindle.

6. The tool of claim 5, wherein with the collar in the predetermined position, the collar is proximate to the bearing assembly, cooperates with the bearing assembly to restrict movement of the spindle relative to the bearing assembly in the first direction, and allows rotation of the spindle about the spindle's axis relative to the bearing assembly.

7. The tool of claim 5, wherein said first portion and said second portion of said internal surface of said striker are annular, proximate to one another, and cooperate to define a countersunk opening portion of said void within said striker.

8. The tool of claim 5, further comprising a guide defining an elongate guide cavity and a first opening to said guide cavity, wherein said guide cavity is operative for receiving and guiding the striker so that the spindle, the collar, and said internal surface of said striker are coaxial while said first opening of said guide is fit over the first end of the spindle.

9. The tool of claim 8, wherein:

said guide defines a lower portion at least partially bounding the first opening and operative for mating with the bearing assembly; and an upper end of said striker extends from a second opening to said guide cavity so that a blow to said upper end of said striker is operative to move said striker and the collar in the first direction to install the collar on the spindle, while the lower portion of the guide is mated with the bearing assembly and said first portion of said internal surface of said spindle is proximate to the collar.

10. The tool of claim 9, further comprising a holder operative for holding the spindle and operative for holding and at least partially bounding the bearing assembly so that the first end of the spindle extends upward from the bearing assembly, the journal of the spindle is journaled by the bearing assembly, and pivoting of the bearing assembly and the spindle about a horizontal axis is limited.

11. The tool of claim 10, wherein:

said holder is a holder means for holding the spindle and at least partially bounding the bearing assembly so that the first end of the spindle extends upward from the bearing assembly, the journal of the spindle is journaled by the bearing assembly, and pivoting of the bearing assembly and the spindle about a horizontal axis is limited;

said guide is a guide means for receiving the first end of the spindle and guiding the striker over the first end of the spindle so that the spindle and the striker are coaxial;

said first portion of said internal surface of said striker is a means for abutting and forcing the collar to move with said striker relative to the spindle in the first direction; and said second portion of said internal surface of said striker is a means for arresting movement of said striker and the collar relative to the spindle when the collar is installed at approximately the predetermined position on the spindle.

12. The tool of claim 10, further comprising:

a second holder operable for holding the bearing assembly when the collar is installed on the spindle so that the first end of the spindle extends from the bearing assembly;

a guide defining an elongate guide cavity and a first opening to said guide cavity operable for fitting over the first end of the spindle while the bearing assembly is held by said second holder and the first end of the spindle extends from the bearing assembly; and a second striker operable for moving within and cooperating with the spindle within the guide cavity to drive the spindle at least partially through the bearing assembly, while the bearing assembly is held by said second holder so that the first end of the spindle extends from the bearing assembly and said guide is fit over the first end of the spindle.

13. The tool of claim 12, wherein said second holder comprises:

holding means for holding the bearing assembly so that the first end of the spindle extends upward from the bearing assembly, and for limiting pivoting of the bearing assembly and the spindle about a horizontal axis, and collecting means positioned below said holding means for containing the spindle after the spindle is driven at least partially through the bearing assembly while the bearing assembly is held by said holding means;

said guide defines a second opening to said guide cavity;

said guide aligns the movement of said striker with the axis of the spindle; and an upper end of said second striker extends from said second opening to said guide cavity so that a blow upon said upper end of said second striker is operative to cause the spindle to move downward relative to said second holder and the bearing assembly and fall at least partially into said collecting means, while the bearing assembly is held by said holding means so that the first end of the spindle extends upward from the bearing assembly, said guide is fit over the first end of the spindle, and said second striker is at least partially within the guide cavity.

14. The tool of claim 12, wherein:

said second holder comprises an upper portion operative for holding the bearing assembly so that the first end of the spindle extends upward from the bearing assembly, and operative for limiting pivoting of the bearing assembly and the spindle about a horizontal axis;

said second holder defines a collection chamber positioned below said upper portion of said second holder for containing the spindle after the spindle is driven at least partially through the bearing assembly while the bearing assembly is held by said upper portion of said second holder;

said guide defines a second opening to said guide cavity; and an upper end of said second striker extends from said second opening so that a blow upon said upper end of said second striker is operative to cause the spindle to move downward relative to said second holder and the bearing assembly and fall at least partially into said collection chamber, while the bearing assembly is held by said second holder so that the first end of the spindle extends upward from the bearing assembly, said guide is fit over the first end of the spindle, and said second striker is at least partially within the guide cavity.

15. The tool of claim 14, wherein said collection cavity, said guide cavity, and said second striker are coaxial, while the bearing assembly is held by said second holder so that the first end of the spindle extends upward from the bearing assembly, the guide is fit over the spindle, and said second striker is at least partially within the guide cavity.

16. The tool of claim 14, wherein while the bearing assembly is held by said second holder so that the first end of the spindle extends upward from the bearing assembly and the guide is fit over the spindle:

said upper portion of said second holder is operative for at least partially bounding a lower portion of the bearing assembly to define a mating relationship;

the guide is operative for sitting upon the bearing assembly and at least partially bounding an upper portion of the bearing assembly to define a mating relationship; and the spindle, said collection cavity, and said guide cavity are coaxial while said upper portion of said second holder and said guide are each in their mating relationship with the bearing assembly.

17. The tool of claim 12, in combination with said spindle and said bearing assembly, wherein:

said bearing assembly comprises an upper portion and a lower portion, and defines an elongate passage through which said spindle is journaled;

said second holder comprises an upper portion mated to and at least partially bounding said lower portion of said bearing assembly so that said first end of said spindle extends upward from said bearing assembly and pivoting of said bearing assembly and said spindle about a horizontal axis is limited;

said first opening of said guide is mated to and at least partially bounding said upper portion of said bearing assembly so that said spindle extends into said guide cavity;

said guide comprises a second opening to said guide cavity through which said second striker extends into said guide cavity, so that a blow upon an upper end of said second striker extending from said second opening to said guide cavity is operative to cause said spindle to move downward relative to said second holder and said bearing assembly; and said second holder defines a collection chamber positioned below said upper portion of said second holder for containing said spindle after said spindle is driven at least partially through said bearing assembly.

18. The tool of claim 17, wherein:

said bearing assembly further comprises a nut positioned between said upper portion of said bearing assembly and said lower portion of said bearing assembly, said nut comprising a lower surface and an upper surface;

said second upper portion of said holder comprises a rim encircling said lower portion of said bearing assembly and upon which said lower surface of said nut rests; and said lower portion of said guide comprises a rim encircling said upper portion of said bearing and resting upon said upper surface of said nut.

19. The tool of claim 5, in combination with said spindle, said bearing assembly, and said collar, wherein:

said collar is encircling said spindle;

said tool further comprises a guide defining an elongate guide cavity and a first opening to said guide cavity at a first end of said guide and a second opening to said guide cavity at a second end of said guide;

said first end of said spindle extends into said first opening to said guide cavity and said striker extends into said second opening to said guide cavity; and said guide aligns said striker with said spindle so that said first portion of said internal surface of said striker at least partially bounds said spindle and abuts said collar so that a blow delivered to an end of said striker extending from said second opening to said guide cavity is operative to install the collar at approximately the predetermined position on said spindle.

20. The tool of claim 5 for holding a spindle and a bearing assembly, the tool further comprising:

a horizontal base plate;

a first upright comprising a lower end connected to said base plate and an upper end extending upward from said base plate, said first upright defining a first cavity and an opening to said first cavity at said upper end of said first upright; and a second upright comprising a lower end connected to said base plate and an upper end extending upward from said base plate, said second upright defining a second cavity and an opening to said second cavity at said upper end of said second upright, wherein the depth of said second cavity is greater than the depth of said first cavity.

21. The apparatus of claim 20, wherein:

said upper end of said first upright is operable for holding the bearing assembly so that a first end of the spindle extends upward from the bearing assembly and pivoting of the bearing assembly and the spindle about a horizontal axis is limited; and said upper end of said second upright is operable for holding the bearing assembly and the spindle so that the first end of the spindle extends upward from the bearing assembly, the journal of the spindle is journaled by the bearing assembly, and pivoting of the bearing assembly and the spindle about a horizontal axis is limited.

* * * * *